(12) United States Patent
Mannava

(10) Patent No.: US 11,648,981 B2
(45) Date of Patent: May 16, 2023

(54) SYSTEMS AND METHODS FOR COLUMN TORQUE ESTIMATION WITHOUT A TORSION BAR

(71) Applicant: STEERING SOLUTIONS IP HOLDING CORPORATION, Saginaw, MI (US)

(72) Inventor: Anusha Mannava, New York, NY (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 100 days.

(21) Appl. No.: 17/394,874

(22) Filed: Aug. 5, 2021

(65) Prior Publication Data
US 2022/0041209 A1 Feb. 10, 2022

Related U.S. Application Data

(60) Provisional application No. 63/062,384, filed on Aug. 6, 2020.

(51) Int. Cl.
*B62D 5/04* (2006.01)
*B62D 15/02* (2006.01)

(52) U.S. Cl.
CPC ......... *B62D 5/0481* (2013.01); *B62D 15/022* (2013.01)

(58) Field of Classification Search
CPC .......................... B62D 5/0481; B62D 15/022
See application file for complete search history.

(56) References Cited

PUBLICATIONS

Motion, C., How to Solve the Challenges of Torque Measurement, Celera Motion, A Novanta Company, Mar. 9, 2018, 11 pages, https://www.azosensors.com/article.aspx?ArticleID=1048.

*Primary Examiner* — Mathew Franklin Gordon
(74) *Attorney, Agent, or Firm* — Dickinson Wright PLLC

(57) ABSTRACT

A method for estimating torsion bar torque includes receiving, from a first sensor, a handwheel position value indicating a position of a handwheel of a steering system and receiving, from a second sensor, a motor position value indicating a position of a motor of the steering system. The method also includes estimating a torsion bar torque value using the handwheel position value and the motor position value.

19 Claims, 5 Drawing Sheets

SYSTEMS AND METHODS FOR COLUMN TORQUE ESTIMATION WITHOUT A TORSION BAR

CROSS-REFERENCES TO RELATED APPLICATIONS

This patent application claims priority to US Provisional Patent Application Ser. No. 63/062,384, filed Aug. 6, 2020, which is incorporated herein by reference in its entirety.

TECHNICAL FIELD

This disclosure relates to column torque estimation and in particular to systems and methods for column torque estimation without a torsion bar.

BACKGROUND

A vehicle, such as a car, truck, sport utility vehicle, crossover, mini-van, marine craft, aircraft, all-terrain vehicle, recreational vehicle, or other suitable vehicle, typically include various steering components of an electronic power steering system, adapted to provide steering assistance to an operator of such a vehicle. Such components typically include one or more sensors adapted to provide various sensed values to controller. The controller typically generates an assist torque using the various sensed values.

SUMMARY

This disclosure relates generally to vehicle steering systems.

An aspect of the disclosed embodiments includes a system for estimating torsion bar torque. The system includes a processor and a memory. The memory includes instructions that, when executed by the processor, cause the processor to: receive, from a first sensor disposed above a column compliance part of a steering system, a handwheel position value indicating a position of a handwheel of a steering system; receive, from a second sensor, a motor position value indicating a position of a motor of the steering system; and estimate a torsion bar torque value using the handwheel position value and the motor position value.

Another aspect of the disclosed embodiments includes a method for estimating torsion bar torque. The method includes receiving, from a first sensor disposed above a column compliance part of a steering system, a handwheel position value indicating a position of a handwheel of a steering system and receiving, from a second sensor, a motor position value indicating a position of a motor of the steering system. The method also includes estimating a torsion bar torque value using the handwheel position value and the motor position value.

Another aspect of the disclosed embodiments includes an apparatus for estimating torsion bar torque. The apparatus includes a processor and a memory. The memory includes instructions that, when executed by the processor, cause the processor to: receive, from a first sensor disposed above a column compliance part of a steering system, a handwheel position value indicating a position of a handwheel of the steering system; receive, from a second sensor, a motor position value indicating a position of a motor of the steering system; estimate a torsion bar torque value using the handwheel position value and the motor position value; and provide closed loop feedback control using the torsion bar torque value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicle, typically include various steering components of an electronic power steering system, adapted to provide steering assistance to an operator of such a vehicle. Such components typically include one or more sensors adapted to provide various sensed values to controller. The controller typically generates an assist torque using the various sensed values.

Typically, in a column assist electronic power steering (CEPS) actuator and/or in a belt-drive handwheel (HW) actuator, column torque is measured by a torsion bar and a torque sensor. This column torque measurement, referred to as T-bar torque, is typically used for shaping steering feel in a steer-by-wire (SbW) system through a closed-loop control system.

T-bar torque may also be used in typically driver torque estimation schemes (e.g. SF44) and advanced driver-assistance system (ADAS) functions such as hands-on-wheel or autonomous-to-driver transition management methods. Overall T-bar torque is used to detect and manage driver activity at the steering wheel.

Figure 2B:
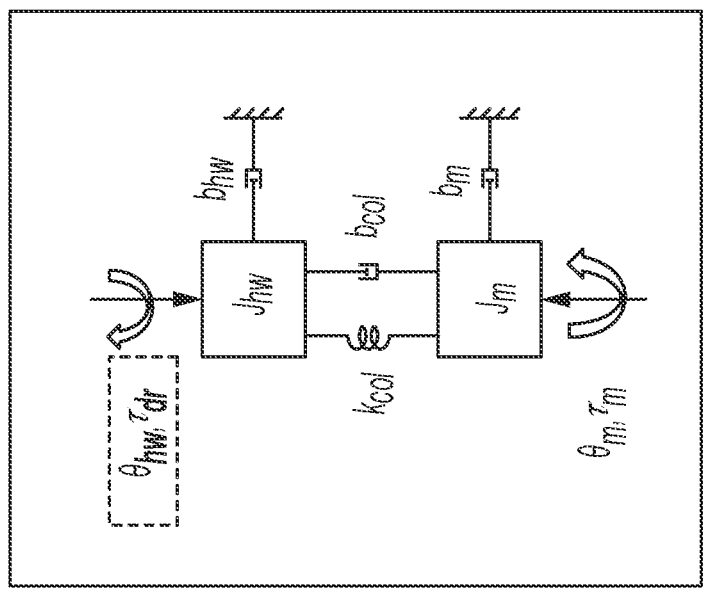
FIG. 2B generally illustrates of mass-spring-damper model for the handwheel actuator of FIG. 2A FIG. 3 generally illustrates a block diagram of a portion of steering system according to the principles of the present disclosure.
Figure 2A:
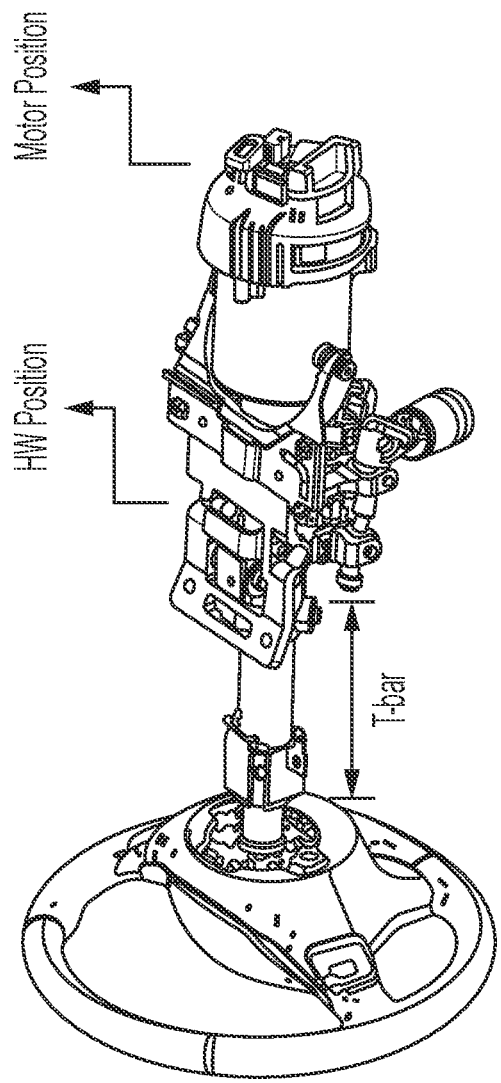
FIG. 2A generally illustrates torsion bar and position sensor placement in typical handwheel actuators according to the principles of the present disclosure.

Typically, in HW actuators, a T-bar is placed in the column, between the handwheel and the motor. An absolute HW position sensor is placed below the T-bar. The motor position is obtained from a motor sensor board attached to the lower shaft of the motor, as is generally illustrated in FIG. 2A. This system can be modeled as a mass-spring-damper system with two masses, as is generally illustrated in FIG. 2B.

This system may be modeled as 2-mass system, with the handwheel modeled as having one-mass denoted by $J_{hw}$ with a damping of $b_{hw}$ and the motor modeled as a second mass denoted by $J_m$, damping of $b_m$. The column connecting the two masses has a stiffness of $k_{col}$ and damping of $b_{col}$. The position and torque applied at the motor $\theta_m$, $\tau_m$ are available for measurement. However, typically, at the driver side, the handwheel position and driver torque are not directly measured or made available. For the system in FIG. 2A, the handwheel position may be obtained from motor position and T-bar torque:

$$\tau_{bar},$$

$$\theta_{hw} = \theta_m + \tau_{bar}/k_{col}$$

Here, without T-bar torque, the true handwheel position cannot be recovered and no information is available from the driver side. The dynamics of this configuration are as follows:

$$\dot{\tau}_{bar} = \tau_{bar}^{rt}$$

$$\dot{\tau}_{bar}^{rt} = \frac{-k_{col}}{J_{hw}}\tau_{bar} - \frac{(b_{hw}+b_{col})}{J_{hw}}\tau_{bar}^{rt} + k_{col}\left(\frac{b_m}{J_m} - \frac{b_{hw}}{J_{hw}}\right)\omega_m - \frac{k_{col}}{J_m}\tau_m + k_{col}\left(\frac{1}{J_{hw}} - \frac{1}{J_m}\right)\tau_{dr}$$

$$\dot{\theta}_m = \omega_m$$

$$\dot{\omega}_m = \frac{-b_m}{J_m}\omega_m + \frac{\tau_m}{J_m} + \frac{\tau_{dr}}{J_m}$$

where $\omega_m$ is motor velocity and $\tau_{bar}^{rt}$ is T-bar rotation. From a system perspective, the states are $x=[\tau_{bar}, \tau_{bar}^{rt}, \theta_m, \omega_m]$, inputs are $u=[\tau_m, \tau_{dr}]$ and the outputs are $y=[\tau_{bar}, \theta_m]$.

However, such typical systems may suffer from the following issues: (i) measurement range may be limited to +/− 10 Newton meters (Nm), whereas column torque may be as high as 64 Nm. Typical end-of-travel (EoT) soft stops in steer-by-wire (SbW) systems is substantially 25 Nm. Without reliable torque measurements in the EoT range, control strategy may switch between closed loop and open loop, causing an unsmooth effect on steering feel, (ii) the T-bar may be prone to hysteresis and adds additional nonlinearity into the HW actuator system that requires compensation, (iii) T-bar may have a 2.6 Nm/degree stiffness. For certain HW maneuvers, T-bar may quickly hit against end-teeth causing a noise, vibration, and harshness issues, and/or (iv) costs associated with packaging T-bar and torque sensor may be relatively high.

Accordingly, systems and methods, such as those described herein, configured to estimate the T-bar torque without a T-bar and/or T-bar position sensor, may be desirable. In some embodiments, the systems and methods described herein may be configured to change the placement of the handwheel position sensor, such that the handwheel position sensor is disposed a column compliance part of the steering system.

Such change in position of the handwheel position sensor may allow displacement of both masses to be available to controller of the steering system. The systems and methods described herein may be configured to use the relative displacement to estimate T-bar torque.

In some embodiments, the systems and methods described herein may be configured to represent dynamics of the steering system (e.g., with the handwheel position sensor disposed above the column compliance part) are as follows:

$$\dot{\theta}_{hw} = \omega_{hw}$$

$$\dot{\omega}_{hw} = \frac{1}{J_{hw}}(-b_{hw}\omega_{hw} - k_{col}(\theta_{hw} - \theta_m) - b_{col}(\omega_{hw} - \omega_m) + \tau_{dr})$$

$$\dot{\theta}_m = \omega_m$$

$$\dot{\omega}_m = \frac{1}{J_m}(-b_m\omega_m + \tau_m + \tau_{dr})$$

$$\tau_{bar} = k_{col}(\theta_{hw} - \theta_m)$$

From a system perspective, the states are $x=[\theta_{hw}, \omega_{hw}, \theta_m, \omega_m]$, inputs are $u=[\tau_{dr}, \tau_{mtr}]$ and outputs are $y=[\theta_{hw}, \theta_m, \tau_{bar}]$.

In some embodiments, the systems and methods described herein may be configured to estimate the T-bar torque using relative displacement and stiffness directly, which may be defined as:

$$\tau_{bar} = k_{col}(\theta_{hw} - \theta_m)$$

The system and methods described herein may be configured to provide direct calculation to provide a reasonable torque estimate. Such a calculation may be used for low frequency or steady state inputs (e.g., at relatively higher frequencies, the phase relationship between the two position data may become more relevant).

In some embodiments, the systems and methods described herein may be configured to estimate the T-bar torque using a transfer function model of compliance, which may be defined as:

$$\tau_{bar} = K_{col}(s)(\theta_{hw} - \theta_{mtr})$$

The systems and methods described herein may be configured to use system identification tools to obtain the dynamics between the relative displacement and T-bar, which may be used to estimate T-bar torque. In some embodiments, the systems and methods described herein may be configured to use a 'stiffness model with relative displacement as an input and T-bar as an output, which may reduce or eliminate issues associated with phase delay of estimation.

In some embodiments, the systems and methods described herein may be configured to estimate T-bar torque using a disturbance style driver torque observer, which may be defined as:

$$\dot{\hat{\theta}}_{hw} = \hat{\omega}_{hw}$$

$$\dot{\hat{\omega}}_{hw} = \frac{1}{J_{hw}}\left(-b_{hw}\hat{\omega}_{hw} - k_{col}(\hat{\theta}_{hw} - \hat{\theta}_m) - b_{col}(\hat{\omega}_{hw} - \hat{\omega}_m) + \hat{\tau}_{dr}\right) + K_1(\omega_{hw} - \hat{\omega}_{hw})$$

$$\dot{\hat{\theta}}_m = \hat{\omega}_m$$

$$\dot{\hat{\omega}}_m = \frac{1}{J_m}(-b_m\hat{\omega}_m + \hat{\tau}_m + \hat{\tau}_{dr}) + K_2(\omega_m - \hat{\omega}_m)$$

$$\dot{\hat{\tau}}_{dr} = K_3(\omega_{hw} - \hat{\omega}_{hw}) + K_4(\omega_m - \hat{\omega}_m)$$

where the estimated variables re denoted by the 'hatted' variables, (●). $K_1$, $K_2$, $K_3$, $K_4$ are gains that are applied to HW position estimation error and motor position estimation error. Theses gains can be chosen through pole placement or through an LQG or Kalman filter design.

The systems and methods described herein may be configured to obtain displacement data from both masses in the HW actuator resulting from the change in HW position sensor placement. The systems and methods described herein may be configured to use this information to design a disturbance style driver torque observer.

In some embodiments, the systems and methods described herein may be configured to measure a column torque within the entire feasible range (e.g., and may not be limited to +/− 10 Nm, as is the case with T-bar measurement). The systems and methods described herein may be configured to provide low noise and reduced or eliminated hysteresis in the T-bar torque estimation (e.g., due to position measurements having increased accuracy and improved signal to noise ratio over typical torque measurements).

The systems and methods described herein may be configured to apply the principles of the present disclosure to any suitable HW actuator with compliance including CEPS and belt-drive systems. The systems and methods described herein may be configured to use only position data for driver torque estimation, which may be computationally less expensive. The systems and methods described herein may be configured to provide a signal for closed loop feedback control in systems without a T-bar. The systems and methods described herein may be configured to provide a backup torque measurement source in case of torque sensor failures for systems with a T-bar.

In some embodiments, the systems and methods described herein may be configured to receive, from a first sensor, a handwheel position value indicating a position of a handwheel of a steering system. The first sensor may be disposed above or proximate to a column compliance part of the steering system. The steering system may include a steer-by-wire steering system or other suitable steering system. The handwheel may include a column assist electronic power steering actuator, a belt-drive handwheel actuator, handwheel actuator, other suitable actuators or components, or a combination thereof. The systems and methods described herein may be configured to receive, from a second sensor, a motor position value indicating a position of a motor of the steering system. The systems and methods described herein may be configured to estimate a torsion bar torque value using the handwheel position value and the motor position value.

In some embodiments, the systems and methods described herein may be configured to determine a relative displacement and a stiffness using the handwheel position value and the motor position value, and estimate the torsion bar torque using the relative displacement and the stiffness.

In some embodiments, the systems and methods described herein may be configured to estimate the torsion bar torque value using a transfer function model of compliance based on the handwheel position value and motor position value. In some embodiments, the systems and methods described herein may be configured to estimate the torsion bar torque value using a disturbance style driver torque observer based on the handwheel position value and the motor position value.

In some embodiments, the instructions further cause the processor to provide closed loop feedback control using the torsion bar torque value.

Figure 1:
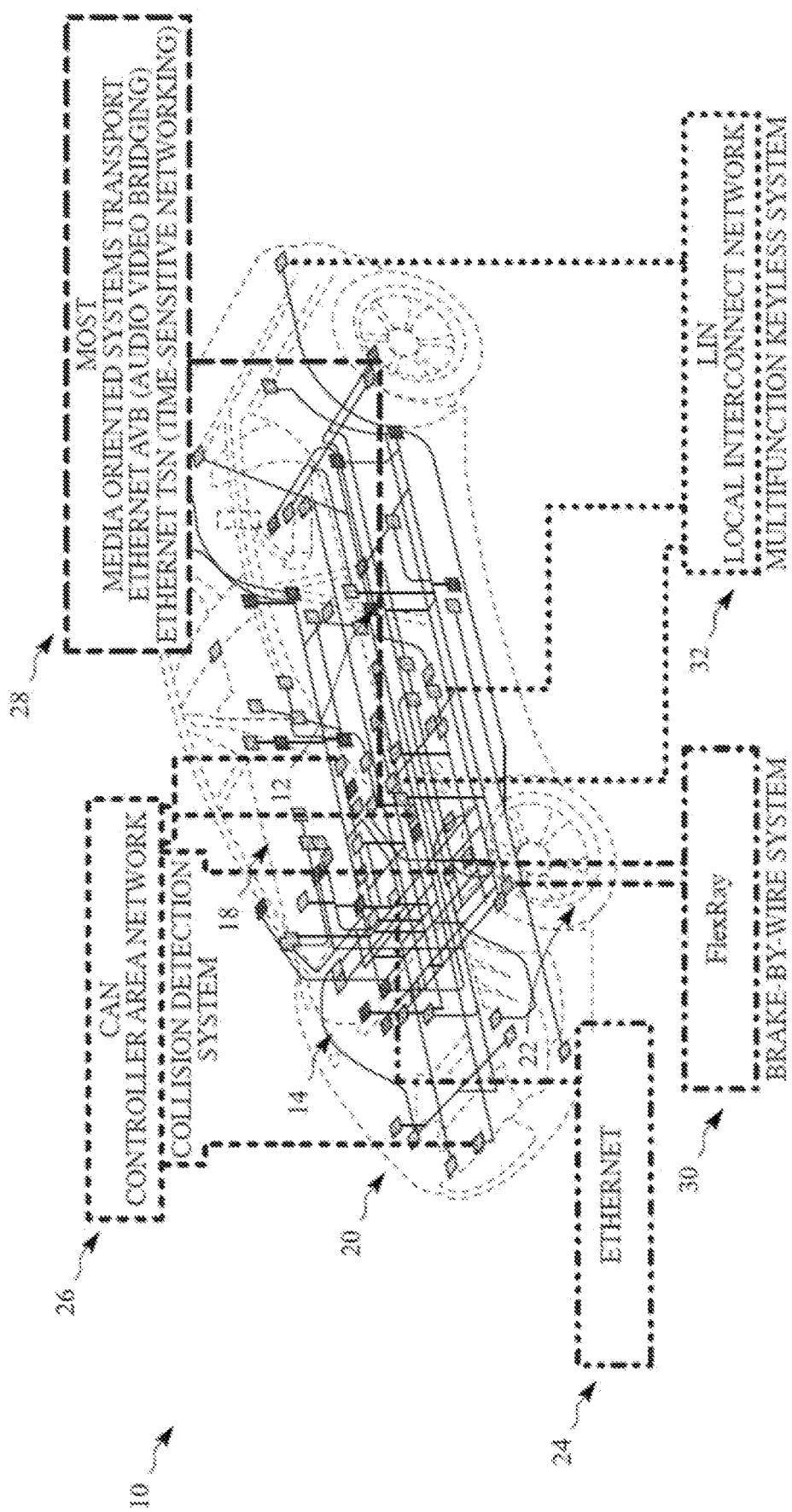
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 3:
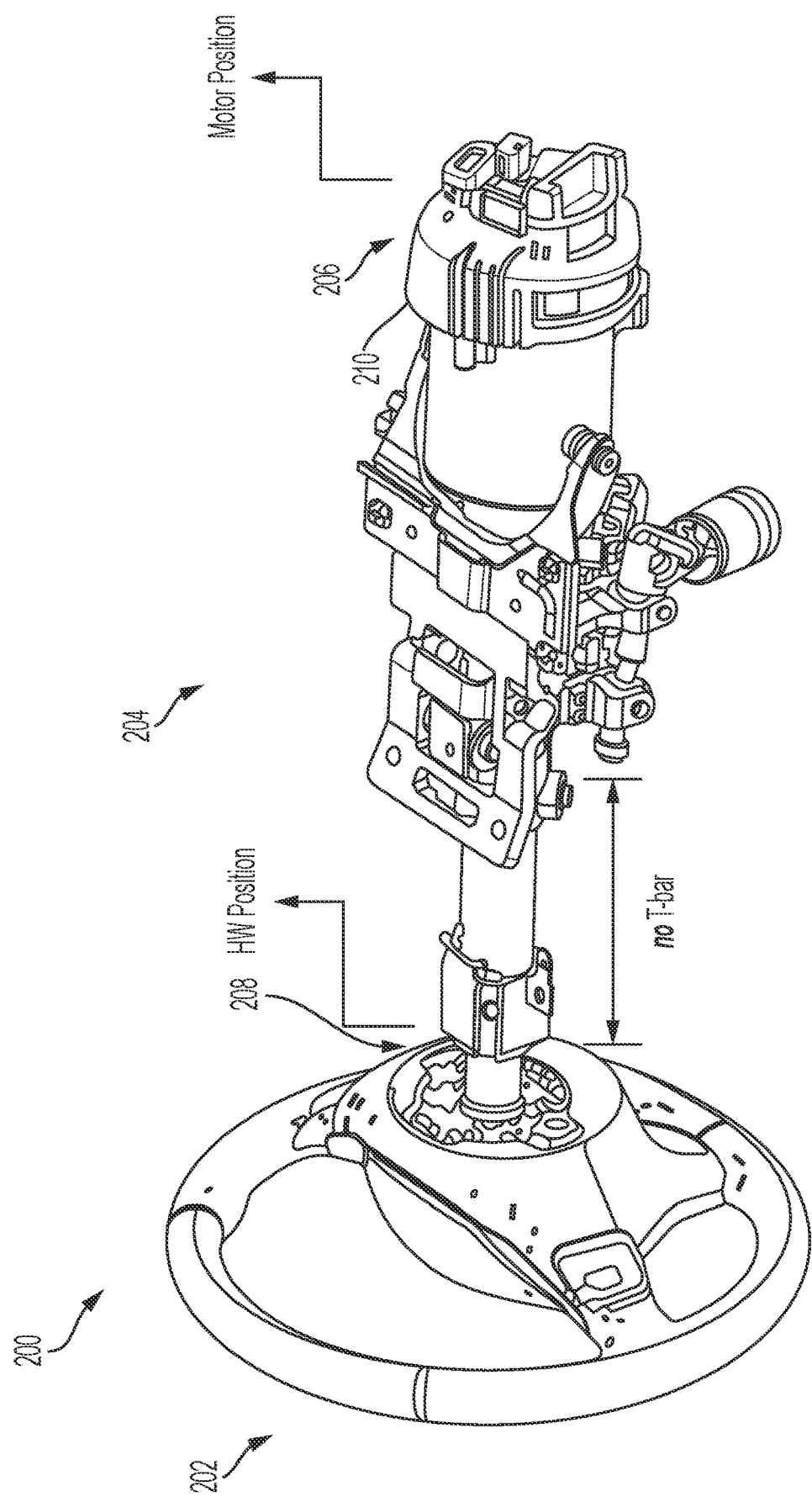

In some embodiments, the vehicle 10 may include steering system, such as an electronic power steering (EPS) system. The EPS may include a column assist EPS (CEPS), a belt-driver EPS, or other suitable EPS. The EPS may include a steering column system 200, as is generally illustrated in FIG. 3.

The system 200 may include a handwheel 202, a column assembly 204, and a motor 206. The motor may be configured to provide a torque assist to the column assembly 204 and/or the handwheel 202. The torque assist may be experienced by the operator of the vehicle 10 as a steering assist, which may reduce an effort required by the operator of the vehicle 10 to actuate the handwheel 202. The column assembly 204 may include a handwheel actuator, and one or more other suitable components.

The system 200 may include a first sensor 208 and a second sensor 210. The first sensor 208 may include a handwheel position sensor or other suitable sensor. The first sensor 208 may be disposed above a column compliance part of component of the column assembly 204. The first sensor 208 may be configured to sense and/or measure a position of the handwheel 202. The first sensor 208 may communicate the handwheel position values to a controller of the EPS, such as the controller 300, as is generally illustrated in FIG. 3.

The second sensor 210 may include a motor position sensor or other suitable sensor. The second sensor 210 may be configured to sense and/or measure a motor position of the motor 206. The second sensor 210 may communicate motor position values to the controller 300. It should be understood that the system 200 may include any suitable sense and may include any suitable number of senses in addition to or instead of those described herein.

The controller 300 may include may include a processor 302 and a memory 304. The processor 302 may include any suitable processor, such as those described herein. Additionally, or alternatively, the controller 300 may include any suitable number of processors, in addition to or other than the processor 302. The memory 304 may comprise a single disk or a plurality of disks (e.g., hard drives), and includes a storage management module that manages one or more partitions within the memory 304. In some embodiments, memory 304 may include flash memory, semiconductor (solid state) memory or the like. The memory 304 may include Random Access Memory (RAM), a Read-Only Memory (ROM), or a combination thereof. The memory 304 may include instructions that, when executed by the processor 302, cause the processor 302 to, at least, estimate a T-bar torque position value.

In some embodiments, the controller 300 may receive, from the first sensor, a handwheel position value indicating a position of the handwheel 202. The controller 300 receive, from the second sensor, a motor position value indicating a position of the motor 206. The controller 300 may estimate a torsion bar torque value using the handwheel position value and the motor position value.

For example, in some embodiments, the controller 300 may determine a relative displacement and a stiffness, as described using the handwheel position value and the motor position value. The controller 300 may estimate the torsion bar torque using the relative displacement and the stiffness.

In some embodiments, the controller 300 estimate the torsion bar torque value using a transfer function model of compliance, as described, based on the handwheel position value and motor position value. In some embodiments, controller 300 may estimate the torsion bar torque value using a disturbance style driver torque observer, as described, based on the handwheel position value and the motor position value. In some embodiments, the controller 300 may control various aspects of the EPS system of the vehicle 10 using the T-bar torque estimation. For example, the controller 300 may generate one or more torque assist values. The controller 300 may provide the one or more torque assist values to the motor 206. The motor 206 may operate according to the torque assist value, which may provide a handwheel assist to the operator of the vehicle 10.

In some embodiments, the system 200 and/or the controller 300 may perform the methods described herein. However, the methods described herein as performed by the system 200 and/or the controller 300 are not meant to be limiting, and any type of software executed on a controller or processor can perform the methods described herein without departing from the scope of this disclosure. For example, a controller, such as a processor executing software within a computing device, can perform the methods described herein.

Figure 4:
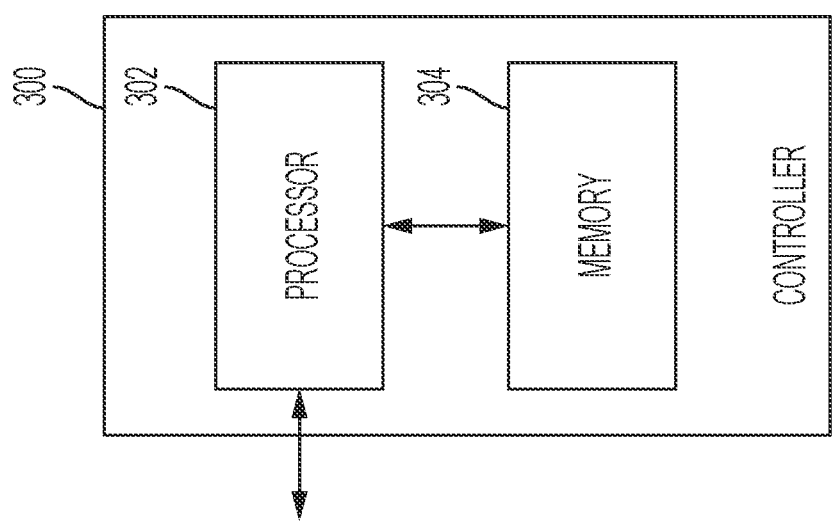
FIG. 4 generally illustrates a torsion bar torque estimation system according to the principles of the present disclosure.
Figure 5:
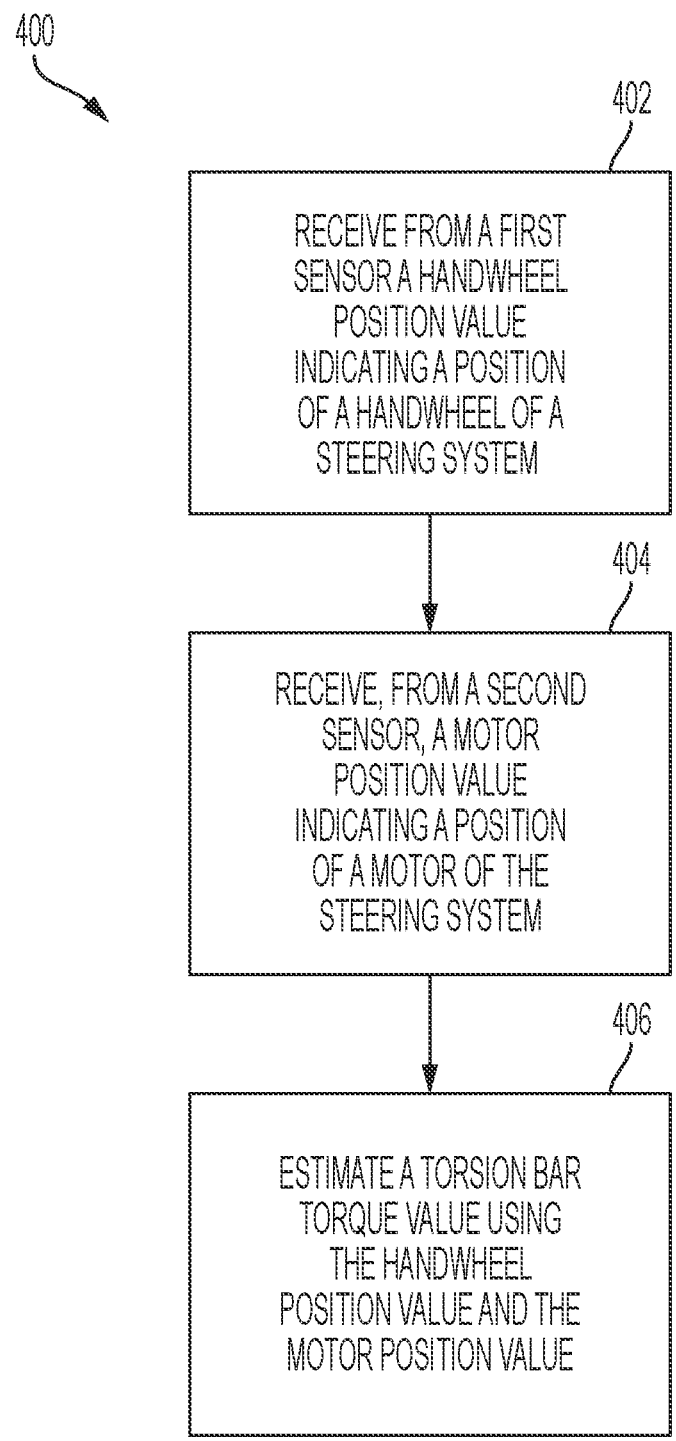
FIG. 5 is a flow diagram generally illustrating a torsion bar torque estimation method according to the principles of the present disclosure.

FIG. 4 is a flow diagram generally illustrating a torsion bar torque estimation method 400 according to the principles of the present disclosure. At 402, the method 400 receives, from a first sensor, a handwheel position value indicating a position of a handwheel of a steering system. For example, the controller 300 receives the handwheel position value from the first sensor 208. The handwheel position value may indicate a position of the handwheel 202. The first sensor 208 may be disposed above the column compliance part or component of the column assembly 204.

At 404, the method 400 receives, from a second sensor, a motor position value indicating a position of a motor of the steering system. For example, the controller 300 receives a motor position value from the second sensor 210. The motor position value may indicate a position of the motor 206.

At 406, the method 400 estimates a torsion bar torque value using the handwheel position value and the motor position value. For example, the controller 300 estimates the T-bard torque value using the handwheel positon value and the motor position value. In some embodiments, the controller 300 may determine a relative displacement and a stiffness, as described using the handwheel position value and the motor position value. The controller 300 may estimate the torsion bar torque using the relative displacement and the stiffness.

In some embodiments, the controller 300 may estimate the torsion bar torque value using a transfer function model of compliance, as described, based on the handwheel position value and motor position value. In some embodiments, controller 300 may estimate the torsion bar torque value using a disturbance style driver torque observer, as described, based on the handwheel position value and the motor position value. In some embodiments, the controller 300 may control various aspects of the EPS system of the vehicle 10 using the T-bar torque estimation. For example, the controller 300 may generate one or more torque assist values. The controller 300 may provide the one or more torque assist values to the motor 206. The motor 206 may operate according to the torque assist value, which may provide a handwheel assist to the operator of the vehicle 10.

In some embodiments, the controller 300 may determine a relative displacement and a stiffness using the handwheel position value and the motor position value, and estimate the torsion bar torque using the relative displacement and the stiffness. In some embodiments, the controller 300 may estimate the torsion bar torque value using a transfer function model of compliance based on the handwheel position value and motor position value. In some embodiments, the controller 300 may estimate the torsion bar torque value using a disturbance style driver torque observer based on the handwheel position value and the motor position value. In some embodiments, the first sensor may be disposed above a column compliance part of the steering system.

In some embodiments, a system for estimating torsion bar torque includes a processor and a memory. The memory includes instructions that, when executed by the processor, cause the processor to: receive, from a first sensor disposed above a column compliance part of a steering system, a handwheel position value indicating a position of a handwheel of the steering system; receive, from a second sensor, a motor position value indicating a position of a motor of the steering system; and estimate a torsion bar torque value using the handwheel position value and the motor position value.

In some embodiments, the instructions further cause the processor to determine a relative displacement and a stiffness using the handwheel position value and the motor position value, and estimate the torsion bar torque using the relative displacement and the stiffness. In some embodiments, the instructions further cause the processor to estimate the torsion bar torque value using a transfer function model of compliance based on the handwheel position value and motor position value. In some embodiments, the instructions further cause the processor to estimate the torsion bar torque value using a disturbance style driver torque observer based on the handwheel position value and the motor position value. In some embodiments, the steering system includes a steer-by-wire steering system. In some embodiments, the handwheel includes a column assist electronic power steering actuator. In some embodiments, the handwheel includes a belt-drive handwheel actuator. In some embodiments, the instructions further cause the processor to provide closed loop feedback control using the torsion bar torque value.

In some embodiments, a method for estimating torsion bar torque includes receiving, from a first sensor disposed above a column compliance part of a steering system, a handwheel position value indicating a position of a handwheel of the steering system. The method also includes receiving, from a second sensor, a motor position value indicating a position of a motor of the steering system. The method also includes estimating a torsion bar torque value using the handwheel position value and the motor position value.

In some embodiments, the method also includes determining a relative displacement and a stiffness using the handwheel position value and the motor position value, and estimating the torsion bar torque using the relative displacement and the stiffness. In some embodiments, the method also includes estimating the torsion bar torque value using a transfer function model of compliance based on the handwheel position value and motor position value. In some embodiments, the method also includes estimating the torsion bar torque value using a disturbance style driver torque observer based on the handwheel position value and the motor position value. In some embodiments, the steering system includes a steer-by-wire steering system. In some embodiments, the handwheel includes a column assist electronic power steering actuator. In some embodiments, the handwheel includes a belt-drive handwheel actuator. In some embodiments, the method also includes providing closed loop feedback control using the torsion bar torque value.

In some embodiments, an apparatus for estimating torsion bar torque includes a processor and a memory. The memory includes instructions that, when executed by the processor, cause the processor to: receive, from a first sensor disposed above a column compliance part of a steering system, a handwheel position value indicating a position of a handwheel of the steering system; receive, from a second sensor, a motor position value indicating a position of a motor of the steering system; estimate a torsion bar torque value using the handwheel position value and the motor position value; and provide closed loop feedback control using the torsion bar torque value.

In some embodiments, the instructions further cause the processor to determine a relative displacement and a stiffness using the handwheel position value and the motor position value, and estimate the torsion bar torque using the relative displacement and the stiffness. In some embodiments, the instructions further cause the processor to estimate the torsion bar torque value using a transfer function model of compliance based on the handwheel position value and motor position value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for estimating torsion bar torque, the system comprising:
   a processor; and
   a memory including instructions that, when executed by the processor, cause the processor to:
   receive, from a first sensor disposed above a column compliance part of a steering system, a handwheel position value indicating a position of a handwheel of the steering system;
   receive, from a second sensor, a motor position value indicating a position of a motor of the steering system; and
   estimate a torsion bar torque value using the handwheel position value and the motor position value.

2. The system of claim 1, wherein the instructions further cause the processor to:
   determine a relative displacement and a stiffness using the handwheel position value and the motor position value; and
   estimate the torsion bar torque using the relative displacement and the stiffness.

3. The system of claim 1, wherein the instructions further cause the processor to estimate the torsion bar torque value using a transfer function model of compliance based on the handwheel position value and motor position value.

4. The system of claim 1, wherein the instructions further cause the processor to estimate the torsion bar torque value using a disturbance style driver torque observer based on the handwheel position value and the motor position value.

5. The system of claim 1, wherein the steering system includes a steer-by-wire steering system.

6. The system of claim 1, wherein the handwheel includes a column assist electronic power steering actuator.

7. The system of claim 1, wherein the handwheel includes a belt-drive handwheel actuator.

8. The system of claim 1, wherein the instructions further cause the processor to provide closed loop feedback control using the torsion bar torque value.

9. A method for estimating torsion bar torque, the method comprising:
   receiving, from a first sensor disposed above a column compliance part of a steering system, a handwheel position value indicating a position of a handwheel of the steering system;
   receiving, from a second sensor, a motor position value indicating a position of a motor of the steering system; and
   estimating a torsion bar torque value using the handwheel position value and the motor position value.

10. The method of claim 9, further comprising:
    determining a relative displacement and a stiffness using the handwheel position value and the motor position value; and
    estimating the torsion bar torque using the relative displacement and the stiffness.

11. The method of claim 9, further comprising estimating the torsion bar torque value using a transfer function model of compliance based on the handwheel position value and motor position value.

12. The method of claim 9, further comprising estimating the torsion bar torque value using a disturbance style driver torque observer based on the handwheel position value and the motor position value.

13. The method of claim 9, wherein the steering system includes a steer-by-wire steering system.

14. The method of claim 9, wherein the handwheel includes a column assist electronic power steering actuator.

15. The method of claim 9, wherein the handwheel includes a belt-drive handwheel actuator.

16. The method of claim 9, further comprising providing closed loop feedback control using the torsion bar torque value.

17. An apparatus for estimating torsion bar torque, the apparatus comprising:
    a processor; and
    a memory including instructions that, when executed by the processor, cause the processor to:
    receive, from a first sensor disposed above a column compliance part of a steering system, a handwheel position value indicating a position of a handwheel of the steering system;

receive, from a second sensor, a motor position value indicating a position of a motor of the steering system;

estimate a torsion bar torque value using the handwheel position value and the motor position value; and provide closed loop feedback control using the torsion bar torque value.

18. The apparatus of claim 17, wherein the instructions further cause the processor to:

determine a relative displacement and a stiffness using the handwheel position value and the motor position value; and estimate the torsion bar torque using the relative displacement and the stiffness.

19. The apparatus of claim 17, wherein the instructions further cause the processor to estimate the torsion bar torque value using a transfer function model of compliance based on the handwheel position value and motor position value.

* * * * *